United States Patent
Huang et al.

(10) Patent No.: US 9,980,196 B2
(45) Date of Patent: May 22, 2018

(54) METHOD AND DEVICE FOR MOBILITY CONTROL

(71) Applicant: Telefonaktiebolaget LM Ericsson (publ), Stockholm (SE)

(72) Inventors: Min Huang, Beijing (CN); Hui Guo, Beijing (CN); Yang Liu, Beijing (CN); Jiying Xu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days. days.

(21) Appl. No.: 15/532,178

(22) PCT Filed: Jan. 16, 2015

(86) PCT No.: PCT/CN2015/070856
§ 371 (c)(1),
(2) Date: Jun. 1, 2017

(87) PCT Pub. No.: WO2016/112530
PCT Pub. Date: Jul. 21, 2016

(65) Prior Publication Data
US 2017/0318516 A1    Nov. 2, 2017

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0094* (2013.01); *H04W 36/08* (2013.01); *H04W 36/20* (2013.01)

(58) Field of Classification Search
CPC ..... H04W 36/08; H04W 36/22; H04W 36/32; H04W 36/30; H04W 36/04; H04W 36/20; H04W 16/10; H04W 52/0225; H04W 72/0453; H04W 72/1231; H04W 8/08; H04W 4/07; H04W 52/282;
(Continued)

(56) References Cited

U.S. PATENT DOCUMENTS

2011/0170516 A1* 7/2011 Hu ............... H04W 36/0083
                                                          370/331
2012/0083280 A1* 4/2012 Liu ................... H04W 16/14
                                                          455/446
(Continued)

FOREIGN PATENT DOCUMENTS

| CN | 101790212 A | 7/2010 |
| CN | 102197677 A | 9/2011 |
| CN | 102215538 A | 10/2011 |
| WO | WO 2011 141073 A1 | 11/2011 |
| WO | WO 2014 168539 A1 | 10/2014 |

OTHER PUBLICATIONS

International Search Report for International application No. PCT/CN2015/070856—dated Oct. 21, 2015.
(Continued)

*Primary Examiner* — Nimesh Patel
(74) *Attorney, Agent, or Firm* — Baker Botts, LLP

(57) ABSTRACT

The embodiments disclose methods and devices for mobility control of UEs in a HetNet with multiple frequency carriers. In the methods, intra-frequency measurement and inter-frequency measurement are performed sequentially for determining a target cell to handover to.

20 Claims, 6 Drawing Sheets

(51) Int. Cl.
*H04W 36/08* (2009.01)
*H04W 36/20* (2009.01)

(58) Field of Classification Search
CPC . H04W 64/006; H04W 52/143; H04W 16/14;
H04W 52/285; H04W 52/367; H04W
16/06; H04W 52/325; H04W 52/46;
H04W 64/00; H04W 72/082; H04W
16/04; H04W 16/08; H04W 84/045;
H04W 24/02; H04W 24/10; H04W 28/08;
H04W 88/08; H04W 88/10; H04W 84/18;
H04W 48/20; H04W 52/244; H04W
36/0088; H04W 76/025; H04W 72/02;
H04W 92/02; H04W 4/02; H04W 52/40;
H04W 4/027; H04W 28/02; H04W 4/006;
H04W 72/00; H04W 72/1247; H04W
4/14; H04W 36/0022; H04W 36/14;
H04W 60/04; H04W 36/0005; H04W
36/0066; H04W 4/16; H04W 76/002;
H04W 68/12; H04W 36/06; H04W 48/18;
H04W 36/0083; H04W 36/18; H04W
4/028
See application file for complete search history.

(56) References Cited

U.S. PATENT DOCUMENTS

| | | | |
|---|---|---|---|
| 2013/0003788 A1* | 1/2013 | Marinier | H04B 7/024 375/219 |
| 2013/0021929 A1* | 1/2013 | Kim | H04B 7/024 370/252 |

OTHER PUBLICATIONS

3GPP TS 36.212 v11.3.0; Technical Specification; 3rd Generation Partnership Project; Technical Specification Group Radio Access Network; Evolved Universal Terrestrial Radio Access (E-UTRA); Multiplexing and channel coding (Release 11)—Jun. 2013.

3GPP TS 36.300 v11.4.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)—Dec. 2012.

* cited by examiner

METHOD AND DEVICE FOR MOBILITY CONTROL

PRIORITY

This nonprovisional application is a U.S. National Stage Filing under 35 U.S.C. § 371 of International Patent Application Serial No. PCT/CN2015/070856 filed Jan. 16, 2015, and entitled "Method And Device For Mobility Control."

TECHNICAL FIELD

The present technology generally relates to radio communication, particularly to a method for mobility management and the device thereof.

BACKGROUND

In Long Term Evolution-Advanced (LTE-A), which is the next-generation cellular communication standard discussed in Third Generation Partnership Project (3GPP), introduction of technology called carrier aggregation (CA) has been studied. The carrier aggregation is technology that forms a communication channel between user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

In LTE-A HetNet scenarios, e.g., a number of small cells, such as micro cell, pico cells and/or femto cells are deployed on top of the regular macro cells, the same carrier frequency is applied for sake of spectrum efficiency. As the inter-cell interferences in-between macro cells and small cells turn out to be severe and have different characters from the traditional pure macro cell scenarios, to reduce strong uplink interference from macro cells to small cells, one positive bias (generally the value is 6 dB or 9 dB) is added into the handover triggering condition when evaluating the downlink signal quality of small cells. This is equivalent to expanding the cell range of the small cell when a UE takes handover between the macro cell and the small cell. This technique is called cell range extension (CRE). More information about CRE can be found in 3GPP TS36.300, E-UTRA Overall Description, such as V11.4.0, December, 2012. In this way, for a UE in the macro cell but close to cell border of the small cell, its distance to the base station of the small cell is increased, so the uplink interference to the small cell caused by the UE is reduced. However, the UEs who lie in the extended area in the small cell, would suffer from strong downlink interference from the macro cell.

When more frequency spectrums are exploited, in order to allow maximum single-UE peak throughput, a number of overlapping cells are deployed by both macro-eNB and small-eNB (such as micro-eNB, pico-eNB or femto-eNB), one cell at one frequency carrier, as shown in FIG. 1. Cell 1 and cell 2 are deployed by one macro-eNB, with cell 1 over frequency 1 and cell 2 over frequency 2 respectively, while cell 3 and cell 4 are deployed by one small-eNB, with cell 3 over frequency 1 and cell 4 over frequency 2 respectively.

This kind of network is called as "HetNet with multiple frequency carriers". Carrier aggregation can be enabled in these co-deployed inter-frequency cells. To reduce the interference on control channel from macro cells to small cells, the technique of cross-carrier scheduling (CCS) which is extended from carrier aggregation could be exploited. Its idea is that different carrier frequencies are allocated to a certain macro cell (cell 2) and a certain small cell (cell 3) respectively as dedicated primary cells (PCells), and the downlink control channels for secondary cells (SCells) (cell 1 and cell 4) are transmitted in these dedicated primary PCells with explicit carrier indicator. In this way, the inter-cell interference on PCell control channel can be avoided. For small cell UEs who lie in an CRE area (we call it CRE-area): downlink control channels of the dedicated PCell is protected from interference of neighbor cells, which dedicated PCell is called protected cell in general; while the dedicated SCell is not protected for downlink control channels, which is called non-protected cell in general. It should be noted that the technique of CCS aims to provide protection only to downlink control channels to the small cell. More information about CCS can be found in 3GPP TS36.212, E-UTRA Multiplexing and channel coding, such as V11.3.0, June, 2013.

Then, for the geographical areas served by the small cells, one portion (inside the original cell border, called non-CRE area) suffers from weak or negligible interference in downlink control channels in any frequency carriers, where downlink control information transfer is available at both the protected cells and the non-protected cells; and the other portion (inside the extended cell border and outside the original cell border, called CRE area) suffers from strong or dominant interference in downlink control channels in the frequency carrier of PCell of overleaped macro cell, where downlink control information transfer is available at only the protected cells rather than non-protected cells. So, over frequency 1, non-CRE area is of "low-interference" area, and CRE area is of "high-interference, protected" area; over frequency 2, non-CRE area is of "low-interference" area, and CRE area is of "high-interference, non-protected" area.

In the CRE area, UE can only camp on the protected cell. For the UE who camps in the protected cell in the CRE area, if it has the capability of CA and CCS, it can take data transfer in both the protected cell and the non-protected cell; otherwise, if it has the capability of CA but not CCS, or it has the capability of neither CA nor CCS, it can take data transfer only in the protected cell.

In the non-CRE area, UE can camp on either the protected cell or the non-protected cell. And UE can take data transfer in both the protected cell and the non-protected cell as long as it has the capability of CA, regardless of CCS.

If the function of CCS is applied to all downlink sub frames of cell 1, the macro cell (cell 1) with the same carrier frequency as the protected small cell lacks of necessary downlink control channels, and hence it cannot accommodate UE for camping. Else, if the function of CCS is applied to a part of downlink sub frames of cell 1, the macro cell (cell 1) with the same carrier frequency as the protected small cell has limited or weakened capability to accommodate UE for camping.

Application of CRE and CCS would result in an area caused by CRE at a certain frequency carrier where the UE is not allowed to access the macro cell or the small cell. The way out for those UEs who are moving toward such area at such frequency carrier is to perform handover to another inter-frequency cell which has been protected by CCS. To handle such scenario, the existing mobility control method is low efficient and hence causes long interruption time and even high drop rate.

SUMMARY

Therefore, it is an object to improve the mobility management for a UE.

According to one aspect of the embodiments, there is provided a method of mobility management for a user equipment, UE, in a wireless communication network, the network comprising at least a first radio base station, RBS, serving at least a first cell over a first frequency and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell. The method comprises: performing intra-frequency measurement for determining whether the UE is within cell range extension, CRE, area of the fourth cell, with a first positive bias for downlink signal quality of the fourth cell being applied for handover triggering condition; in case that the UE connected to the second cell or the fourth cell is within the CRE area of the fourth cell, performing the following steps: performing inter-frequency measurement for a target cell selection, with a second positive bias for downlink signal quality of the third cell being applied for handover triggering condition; and performing handover to the target cell.

According to another aspect of the embodiments, there is provided a user equipment, UE, in a wireless communication network, the network comprising at least a first radio base station, RBS, serving at least a first cell over a first frequency and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell. The UE comprises: an intra-frequency measuring component, adapted for performing intra-frequency measurement for determining whether the UE is within cell range extension, CRE, area of the fourth cell, with a first positive bias for downlink signal quality of the fourth cell being applied for handover triggering condition; an inter-frequency measuring component, adapted for performing inter-frequency measurement for a target cell selection with a second positive bias for downlink signal quality of the third cell being applied for handover triggering condition in case that the UE connected to the second cell or the fourth cell is within the CRE area of the fourth cell; and a first handover component, adapted for performing handover to the target cell.

According to another aspect of the embodiments, there is provided a method of mobility management for a user equipment, UE, in a wireless communication network, the network comprising at least a first radio base station, RBS, serving at least a first cell over a first frequency and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell. The method is performed in the RBS and comprises: determining position of the UE in relation to cell range extension, CRE, area of the fourth cell via intra-frequency measurement, with a first positive bias for downlink signal quality of the fourth cell being applied for handover triggering condition; in case that the UE connected to the second cell or the fourth cell is within the CRE area of the fourth cell, performing the following steps: selecting a target cell via at least inter-frequency measurement, with a second positive bias for downlink signal quality of the third cell being applied for handover triggering condition; and commanding the UE to perform handover to the target cell.

According to another aspect of the embodiments, there is provided a radio base station, RBS, in a wireless communication network, the network comprising at least a first radio base station, RBS, serving at least a first cell over a first frequency and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell. The RBS comprises: a position determiner, adapted for determining position of the UE in relation to cell range extension, CRE, area of the fourth cell via intra-frequency measurement, with a first positive bias for downlink signal quality of the fourth cell being applied for handover triggering condition; a target cell selector, adapted for selecting a target cell via at least inter-frequency measurement, with a second positive bias for downlink signal quality of the third cell being applied for handover triggering condition in case that the UE connected to the second cell or the fourth cell is within the CRE area of the fourth cell; and a first handover commanding component, adapted for commanding the UE to perform handover to the target cell.

According to a further aspect of the embodiments, there is provided a computer program product, which comprises the instructions for implementing the steps of the methods as described above.

According to a still further aspect of the embodiments, there is provided a recording medium which stores instructions for implementing the steps of the methods as described above.

According to a still further aspect of the embodiments, there is provided a radio network entity, comprising: a memory, adapted to store instructions therein; a processing system, adapted to execute the instructions; a network interface, adapted to send and receive data in the wireless communication network; a communication media, adapted for communication between the memory, the processing system and the network interface; wherein: when the instructions are executed in the processing system, cause the processing system to implement the steps of the methods as described above.

As a whole or by scenario, it is advantageous to change the number of handover steps from two in the existing method to one, which contribute to reduction of the handover interruption time and hence make the mobility smoother and more robust.

BRIEF DESCRIPTION OF THE DRAWINGS

The technology will now be described, by way of example, based on embodiments with reference to the accompanying drawings, wherein.

DETAILED DESCRIPTION

Figure 1:
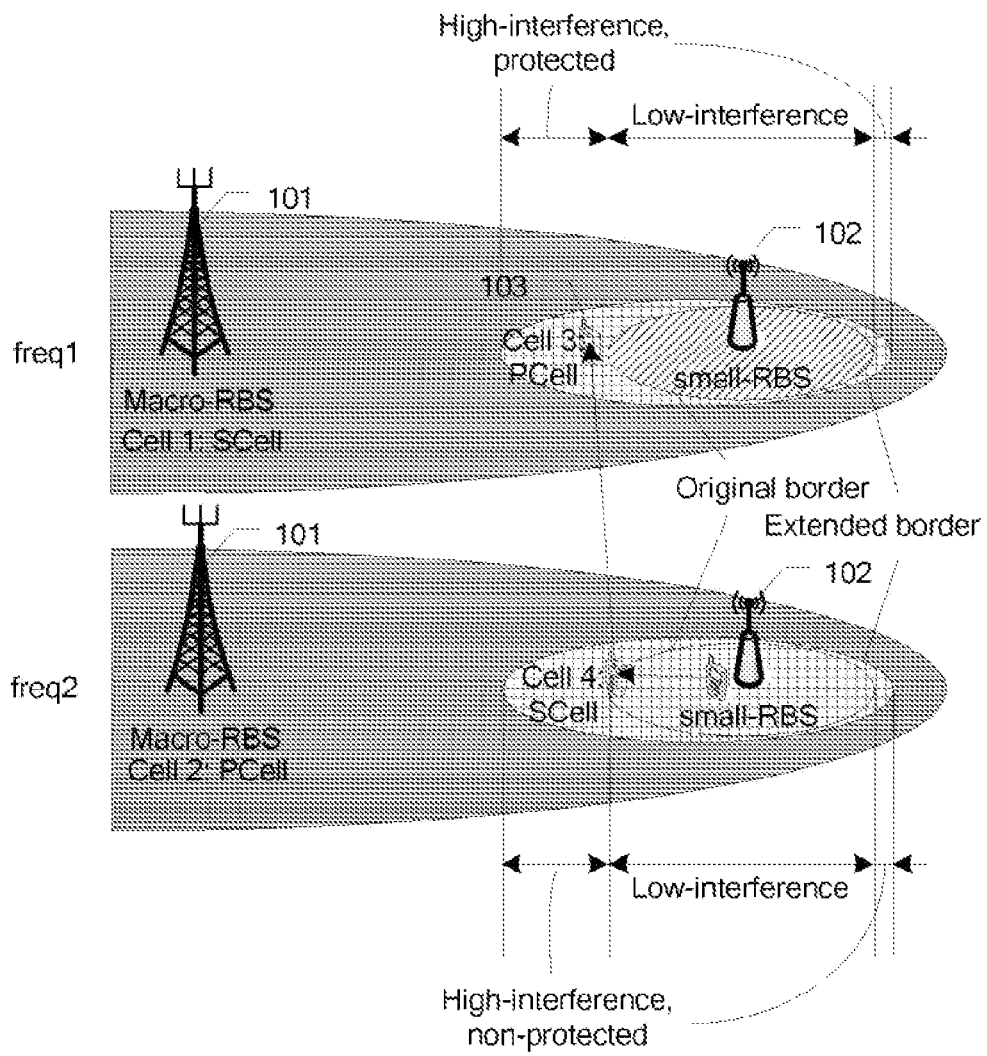
FIG. 1 illustrates a schematic view of the environment in which embodiments are implemented.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Embodiments herein will be described below with reference to the drawings.

Hereinafter, the embodiments will be described in the context of LTE-A based multi-carrier HetNet systems. However, such description is only exemplary, rather than restrictive, and the embodiments could be generalized to the HetNet with any kind of wireless access technologies, where the cells with different frequency carriers are co-deployed for the macro-eNB and small-cell eNB. At such scenarios, small cells are protected for combating the interference coming from the macro cell in a part of the frequency carriers.

In the context, "overlap" or its transformation describes a scenario that at least two objects totally cover each other, or one is totally in the coverage of the other. Overlapped cells can also be referred to as neighbor cells. Intra-frequency measurement, as is known in the art, refers to measuring signal quality of cells over the same frequency, while inter-frequency measurement, as is also known in the art, refers to measuring signal quality of cells over a different frequency.

As shown in FIG. 1, multi-carrier HetNet system comprises at least a macro radio base station (RBS) 101 and a small RBS 102.

Further, those skilled in the art will also appreciate that a macro RBS 101 is sometimes also referred to in the art as a macro base station, a node B, or B-node, an eNodeB (eNB), etc., besides, also other transceivers or wireless communication stations used to communicate with a user equipment (UE) 103.

Further, those skilled in the art will also appreciate that a small RBS 102 is sometimes also referred to in the art as a micro/femto/pico base stations, a micro/femto/pico node B, or micro/femto/pico B-node, a femto/pico eNodeB (eNB), etc., besides, also other transceivers or wireless communication stations used to communicate with the UE 103.

In the illustrated environment, each of RBS 101 and RBS 102 is shown as serving one cell over frequency 1 and another cell over frequency 2. Each cell is represented by a circle (with part of the circle not shown in some cells) which surrounds the respective RBS 101 and RBS 102. It will be appreciated by those skilled in the art, however, that an RBS 101 or RBS 102 may serve for communicating across the air interface for more than two cells.

Just for sake of clarity, cell 1 over frequency 1 and cell 2 over frequency 2 are illustrated as two layers of similar range and two macro RBSs are shown. Actually cell 1 and cell 2 are geographically at least partly overlapped and share the same macro RBS 101. Similarly, Just for sake of clarity, cell 3 over frequency 1 and cell 4 over frequency 2 are illustrated as two layers of similar range and two small RBSs are shown. Actually cell 3 and cell 4 are geographically at least partly overlapped and share the same small RBS 102.

It will be appreciated in the art that if the two frequencies lie in the same frequency band and each of the common RBS has the same transmit power at these two frequencies, the two co-deployed cells corresponding to these two frequencies normally have the same coverage size. Otherwise, the co-deployed cells may not have the same coverage size.

A UE, such as the UE 103 shown in FIG. 1, communicates with one cell or one RBS over an air interface. For simplicity and clarity, there is only one UE moving among different positions. It will be appreciated that different numbers of UEs may be served by those cells at the meantime. The term "UE" used herein may indicate all forms of devices enabled to communicate via a radio communication network, such as mobile telephones ("cellular" telephones) and laptops with mobile termination, and thus can be, for example, portable, pocket, hand-held devices, such as mobile phones, smart phones, personal digital assistants (PDA); computer-included devices, such as desktops, laptops; vehicles, or other devices, such as meters, household appliances, medical appliances, multimedia devices, etc., which communicate voice and/or data with radio access network.

CCS and CRE are applied to the system of FIG. 1. Two small circles are shown around the small RBS 102 over each frequency, wherein the inner circle is original border of cell 3 or cell 4, while the outer circle is extended border of cell 3 or cell 4. We define that the CRE area comprises both the original cell border and the extended cell border and we define that cell 2 and cell 3 are PCells while cell 1 and cell 4 are SCells in the embodiments described herein.

To achieve both low UE drop-rate and high cell throughput, the UE who stay at CRE area should camp on the protected small cell. This requires the mobility control method not only taking into account the coverage of serving cell and overlapped cell, but also taking into account the coverage of the co-deployed inter-frequency protected cells and macro cells.

The existing mobility control method neglects the consideration of co-deployed inter-frequency cells and hence result in bad performance, as follows: when a UE who is camped at the non-protected cell (cell 4) is moving from small-eNB towards macro-eNB, the existing mobility control requires consecutive two steps of PCell changes. Since cell 4 is a non-protected cell, the UE is not expected to be served by this cell when it enters into its CRE area, so the intra-frequency measurement is configured without cell individual offset (CIO) (i.e. bias=0 dB). When the UE reaches the CRE area border, it performs the first handover to the overlapped intra-frequency macro cell (cell 2), triggered by e.g. intra-frequency A3 event without CIO bias. Then, at the macro cell (cell 2), the inter-frequency measurement is configured with CRE bias as the CIO bias (i.e. bias=6 dB). This UE performs the second handover to the overlapped inter-frequency small cell (cell 3), triggered by e.g. inter-frequency A3 event with 6 dB CIO bias. Though this UE finally arrives at the protected cell, the experienced two-step handover would cause longer interruption time.

Definition of A3 event can be found in section 5.5.4.4, 3GPP TS 36.331, E-UTRA, Radio Resource Control, such as V11.0.0, September, 2012. 3GPP TS 36.331 defines a series of events, wherein Event A1 defines that measurement in the Serving cell becomes better than threshold, Event A2 defines that measurement in the serving cell becomes worse than threshold, Event A3 defines that measurement in neighbor cell becomes offset better than that in PCell, Event A4 defines that measurement in neighbor cell becomes better than threshold, Event A5 defines that measurement in PCell becomes worse than threshold 1 and measurement in neighbor cell becomes better than threshold 2, and Event A6 defines measurement in neighbor cell becomes offset better than SCell.

We propose a new mobility control method. Firstly, whether the served UE arrives at border of non-protected area, i.e., CRE area, is detected by configuring the UE to measure signal qualities of serving cell and intra-frequency overlapped cells. The border of non-protected area includes the outer border where signal quality value of the macro cell is equal to the signal quality value of the small cell plus a CRE bias and the inner border where the signal quality value of the macro cell is equal to the signal quality value of the small cell. Secondly, when the detected event happens, macro RBS or small RBS investigates signal quality of inter-frequency cells, including another macro cell and another small cell, by configuring the UE to measure signal qualities of the inter-frequency overlapped cells, with another CRE bias as CIO bias for the small cell. Metrics of signal qualities could be reference signal received power (RSRP), reference signal received quality (RSRQ) or other metrics considering signal strengths of the serving cell and/or overlapped cells. Then the macro RBS or small RBS selects the inter-frequency cell which has the best biased signal quality as the target cell. The "biased" signal quality of the macro cell equals raw value of the signal quality value, while the biased signal quality of the small cell equals raw value of the signal quality plus CRE bias. Afterwards, the serving RBS commands the UE to perform handover to the selected target cell.

Figure 2:
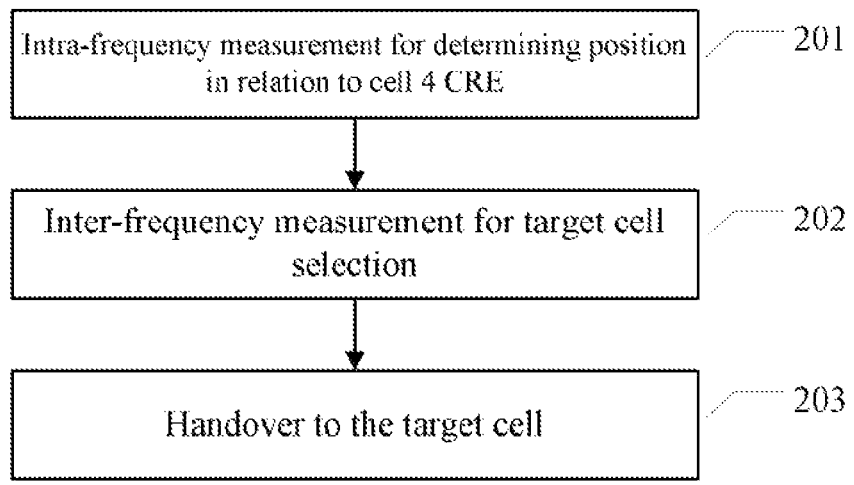
FIG. 2 illustrates a flowchart of one method performed in a UE in accordance with embodiments of the present invention.

With reference to FIG. 2, a method of mobility control performed in UE 103 is described as follows. At step 201, the UE 103 performs intra-frequency measurement for determining whether the UE 103 is within CRE area of cell 4, with a CRE bias for downlink signal quality of cell 4 being applied for handover triggering condition. In case that the UE 103 connected to cell 2 or cell 4 is within the CRE area of cell 4, the UE 103 performs the following steps: it performs inter-frequency measurement for a target cell selection at step 202, with another CRE bias for downlink signal quality of cell 3 being applied for handover triggering condition; and it performs handover to the target cell at step 203.

Figure 3:
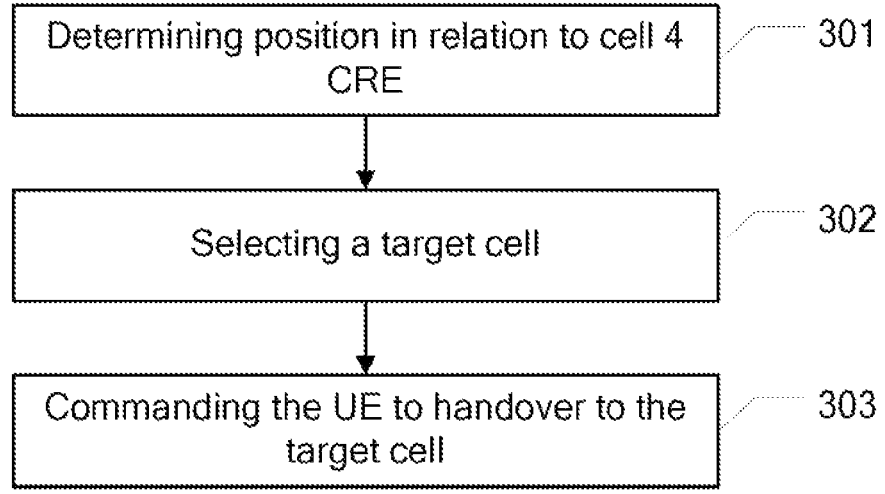
FIG. 3 illustrates a flowchart of one method performed in an RBS in accordance with embodiments of the present invention.

With reference to FIG. 3, a method of mobility control performed in RBS 102 is described as follows. At step 301, the RBS 102 determines position of the UE in relation to CRE area of cell 4 via intra-frequency measurement, with a CRE bias for downlink signal quality of cell 4 being applied for handover triggering condition. In case that the UE 103 connected to cell 2 or cell 4 is within the CRE area of cell 4, performing the following steps: it selects a target cell via at least inter-frequency measurement at step 302, with another CRE bias for downlink signal quality of cell 3 being applied for handover triggering condition; then it commands the UE to perform handover to the target cell at step 303.

Details of our proposed methods of mobility control will be described below with reference to FIGS. 4-9.

Figure 4:
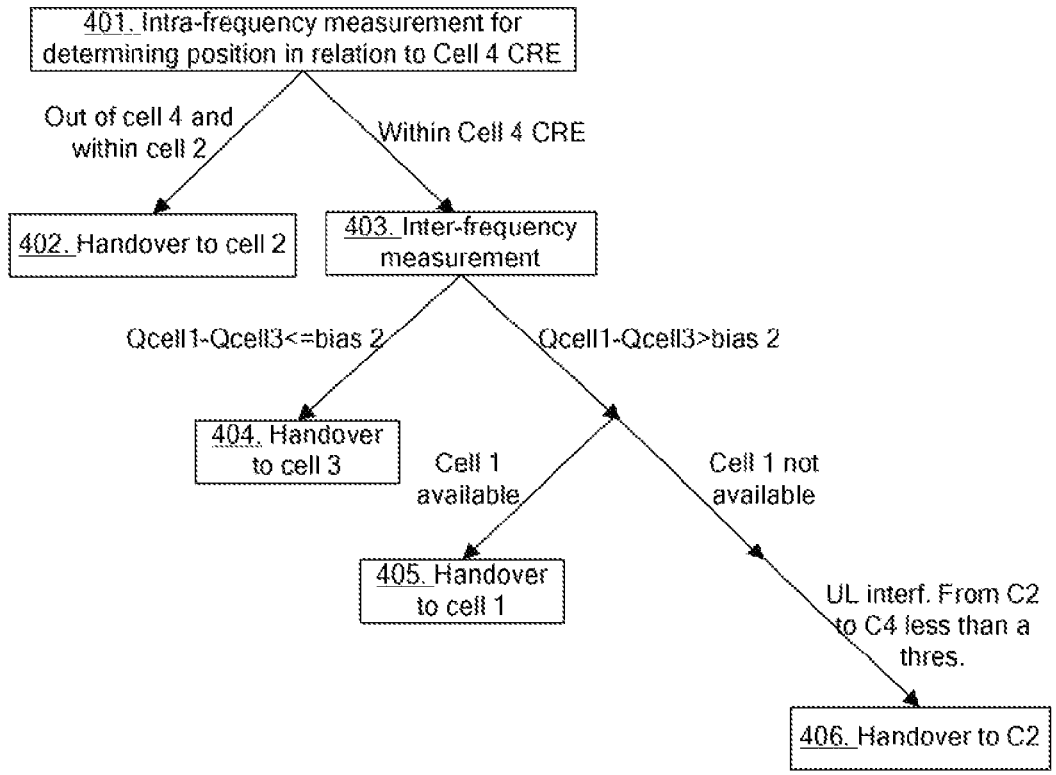
FIG. 4 illustrates a flowchart of one method performed in a UE in accordance with embodiments of the present invention.

FIG. 4 illustrates a flowchart of one method performed in a UE in accordance with embodiments of the present invention. In the scenario of FIG. 4, the UE 103 is initially connected to cell 4 and moves towards the macro RBS 101. At step 401, the UE 103 performs intra-frequency measurement for determining its position in relation to CRE area of cell 4. It is noted when the UE 103 is within the original cell border of cell 4, signal quality of cell 4 is better than that of cell 2, when the UE 103 locates right on the original cell border of cell 4, signal quality of cell 4 equals that of cell 2. When the UE 103 locates right on extended cell border of cell 4, signal quality of cell 2 equals that of cell 4 plus CRE bias of cell 4. When the UE is out of cell 4, signal quality of cell 2 is better than that of cell 4 plus CRE bias of cell 4. Reference signal received power (RSRP) or reference signal received quality (RSRQ) can be used to indicate the signal quality. So in case that measured signal quality value from cell 2 is larger than that from cell 4 plus the CRE area, i.e., the UE is out of extended cell border of cell 4 and within cell range of cell 2, for example position A in FIG. 6, it will perform handover to cell 2 at step 402.

Figure 6:
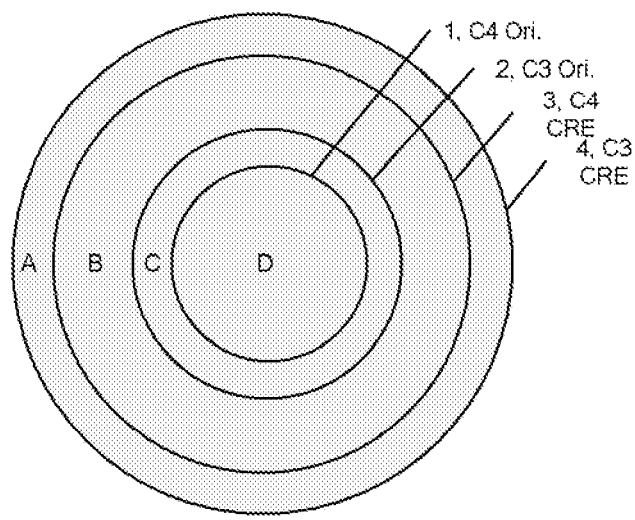
FIG. 6 illustrates one deployment of cells in which embodiments are implemented.
Figure 7:
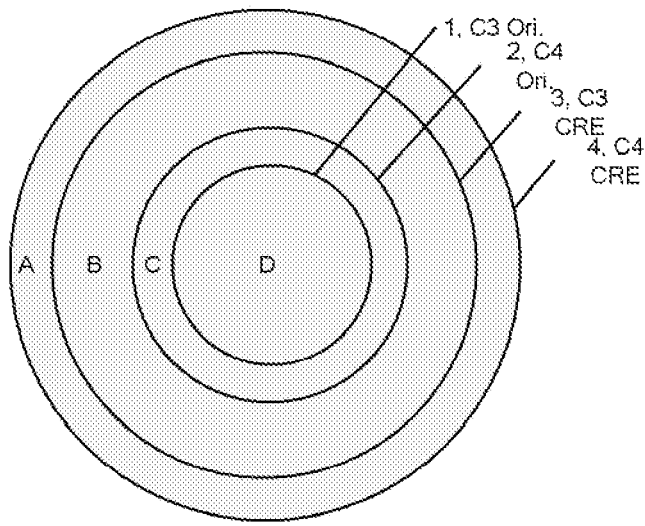
FIG. 7 illustrates another deployment of cells in which embodiments are implemented.

When the UE 103 moves into CRE area of cell 4 (with outer border where the signal quality value of cell 2 is equal to the signal quality value of cell 4 plus its CRE bias and the inner border where the signal quality value of cell 1 is equal to the signal quality value of cell 4 included), it will perform inter-frequency measurement at step 403, i.e., measuring signal qualities of inter-frequency cells of cell 1 and cell 3. It is noted when the UE 103 locates right on the extended cell border of cell 3, signal quality value of cell 1 equals that of cell 3 plus CRE bias of cell 3. When the UE 103 is out of the extended cell border of cell 3, signal quality value of cell 1 is better that of cell 3 plus CRE bias of cell 3. When the UE is within the extended cell border of cell 3, signal quality value of cell 1 is worse than that of cell 3 plus CRE bias of cell 3. In some scenarios, such measuring is not necessarily required. For example, if the two frequency carriers lie in the same frequency band and each of the common RBS has the same transmit power at these two frequencies, the two co-deployed cells corresponding to these two frequencies normally have the same coverage size. Therefore, the UE 103 who is in the "high-interference, non-protected" CRE area of the non-protected cell (cell 4) is right in the "high-interference, protected" CRE area of the protected cell (cell 3). For another example, for the possible reason that the two frequency carriers lie in different frequency bands or each or any of the common RBS has different transmit powers at these two frequencies, the two co-deployed cells corresponding to these two frequencies may have different coverage sizes. If the protected cell (cell 3) is larger than the non-protected cell (cell 4), the UE 103 who is in the "high-interference, non-protected" CRE area of the non-protected cell (cell 4) is also in the protected cell (cell 3). FIG. 6 illustrates a deployment of such a scenario, wherein circle 1 stands for original cell border of cell 4, circle 2 stands for original cell border of cell 3, circle 3 stands for extended cell border of cell 4 and circle 4 stands for extended cell border of cell 3. Positions B and C, which are between original cell border of cell 4 and extended cell border of cell 4, i.e., CRE area of cell 4, are obviously within circle 4, i.e., cell range (herein cell range refers to original cell range plus CRE area) of cell 3. However, in the deployment of FIG. 7 where the protected cell (cell 3) is smaller than the non-protected cell (cell 4), things are not necessarily the same. In the scenario of FIG. 7, positions A and B both belonging to the CRE area of cell 4 does not ensure them within cell 3, for example, position A is out of cell 3 and thus measuring of the signal qualities of inter-frequency cells of cell 1 and 3 is needed to determine the position in relation to cell 3.

In case that signal quality value from cell 1 is not bigger than that from cell 3 plus the CRE bias of cell 3, i.e., the UE 103 within the CRE area of cell 4 is also within cell 3 (extended cell border of cell 3 included), for example, the UE 103 locates in positions B or C of FIG. 6 or location B of FIG. 7, then cell 3 is selected as the target cell, and the UE 103 will perform handover to cell 3 at step 404. In case that signal quality value from cell 1 is bigger than that from cell 3 plus the CRE bias of cell 3, i.e., the UE 103 within the CRE area of cell 4 is out of cell 3, for example the UE 103 locates in position A of FIG. 7, the process will proceed to two branches: with an additional condition that cell 1 is available being satisfied, the UE 103 will perform handover to cell 1 at step 405, otherwise, the UE will count on the RBS to detect uplink interferences from cell 2 to cell 4. Generally, if the uplink interference from cell 2 to cell 4 is severe, for example, uplink interference strength not less than a predetermined threshold, the UE 103 will just stay in cell 4, and if the uplink interference is not severe, for example, uplink interference strength less than a predetermined threshold, the UE 103 will perform handover to cell 2 at step 406.

It is noted that herein cell 1 is available can be understood as cell 1 is able to accommodate the UE for camping.

Figure 5:
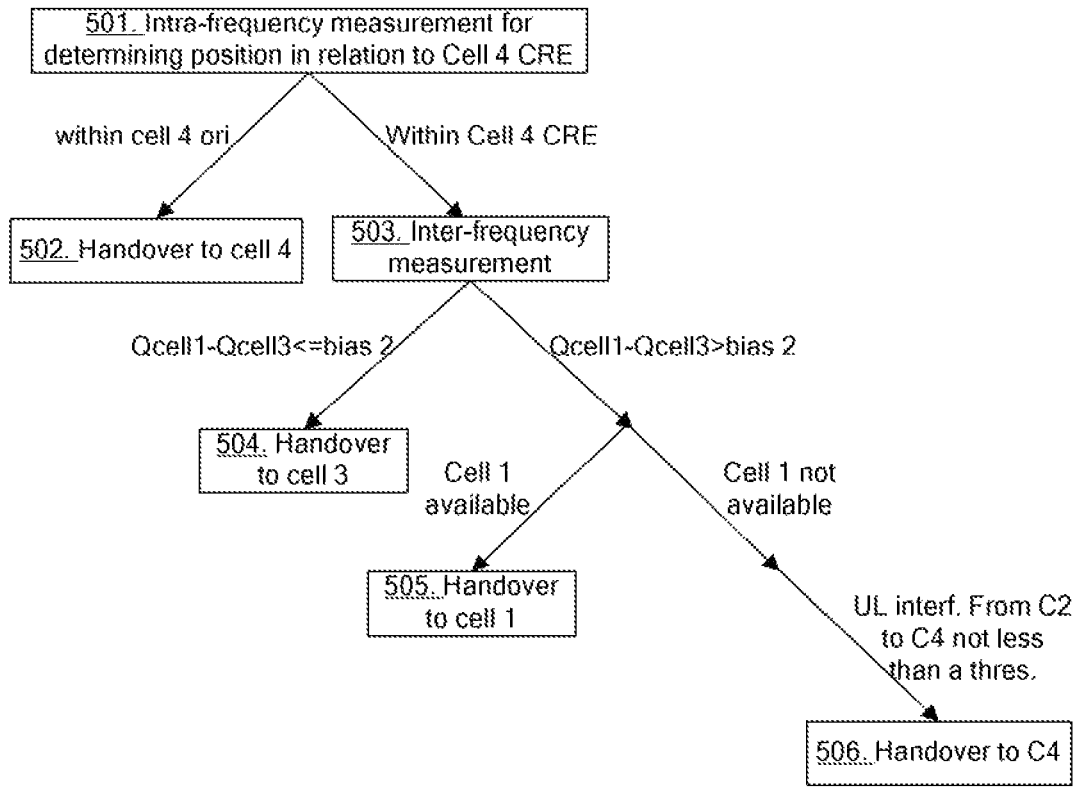
FIG. 5 illustrates a flowchart of another method performed in a UE in accordance with embodiments of the present invention.

FIG. 5 illustrates a flowchart of another method performed in a UE in accordance with embodiments of the present invention. In the scenario of FIG. 5, the UE 103 is initially connected to cell 2 and moves towards the small RBS 102. At step 501, the UE 103 performs intra-frequency measurement for determining its position in relation to CRE area of cell 4. In case that measured signal quality value from cell 2 is smaller than that from cell 4, i.e., the UE is within original cell range of cell 4, for example position D in FIG. 6, it will perform handover to cell 4 at step 502. When the UE 103 moves into CRE area of cell 4 (with outer border where the signal quality value of cell 2 is equal to the signal quality value of cell 4 plus its CRE bias and the inner border where the signal quality value of cell 1 is equal to the signal quality value of cell 4 included), it will perform inter-frequency measurement at step 503, i.e., measuring signal qualities of inter-frequency cells of cell 1 and cell 3. It is noted when the UE 103 locates right on the extended cell border of cell 3, signal quality value of cell 1 equals that of cell 3 plus CRE bias of cell 3. When the UE 103 is out of the extended cell border of cell 3, signal quality value of cell 1 is better that of cell 3 plus CRE bias of cell 3. When the UE 103 is within the extended cell border of cell 3, signal quality value of cell 1 is worse that of cell 3 plus CRE bias of cell 3. In some scenarios, such measuring is not necessarily required. For example, if the two frequency carriers lie in the same frequency band and each of the common RBS has the same transmit power at these two frequencies, the two co-deployed cells corresponding to these two frequencies normally have the same coverage size. Therefore, the UE 103 who is in the "high-interference, non-protected" CRE area of the non-protected cell (cell 4) is just in the "high-interference, protected" CRE area of the protected cell (cell 3). For another example, for the possible reason that the two frequency carriers lie in different frequency bands or each or any of the common RBS has different transmit powers at these two frequencies, the two co-deployed cells corresponding to these two frequencies may have different coverage sizes. If the protected cell (cell 3) is larger than the non-protected cell (cell 4), the UE 103 who is in the "high-interference, non-protected" CRE area of the non-protected cell (cell 4) is also in the protected cell (cell 3). FIG. 6 illustrates a deployment of such a scenario, wherein circle 1 stands for original cell border of cell 4, circle 2 stands for original cell border of cell 3, circle 3 stands for extended cell border of cell 4 and circle 4 stands for extended cell border of cell 3. Positions B and C, which are between original cell border of cell 4 and extended cell border of cell 4, i.e., CRE area of cell 4, are obviously within circle 4, i.e., cell range (herein cell range refers to original cell range plus CRE area) of cell 3. However, in the deployment of FIG. 7 where the protected cell (cell 3) is smaller than the non-protected cell (cell 4), things are not necessarily the same. In the scenario of FIG. 7, positions A and B both belonging to the CRE area of cell 4 does not ensure them within cell 3, for example, position A is out of cell 3 and thus measuring of the signal quality values of inter-frequency cells of cell 1 and 3 is needed to determine the position in relation to cell 3.

In case that signal quality value from cell 1 is not bigger than that from cell 3 plus the CRE bias of cell 3, i.e., the UE 103 within the CRE area of cell 4 is also within cell 3 (extended cell border of cell 3 included), for example, the UE 103 locates in positions B or C of FIG. 6 or location B of FIG. 7, then cell 3 is selected as the target cell, and the UE 103 will perform handover to cell 3 at step 504. In case that signal quality value from cell 1 is bigger than that from cell 3 plus the CRE bias of cell 3, i.e., the UE 103 within the CRE area of cell 4 is out of cell 3, for example the UE 103 locates in position A of FIG. 7, the process will proceed to two branches: with an additional condition that cell 1 is available being satisfied, the UE 103 will perform handover to cell 1 at step 505, otherwise, the UE will count on RBS to detect uplink interferences from cell 2 to cell 4. Generally, if the uplink interference from cell 2 to 4 is not severe, for example, uplink interference strength less than a predetermined threshold, the UE 103 will just stay in cell 2, and if the uplink interference is severe, for example, uplink interference strength not less than a predetermined threshold, the UE 103 will perform handover to cell 4 at step 506.

It is noted that herein cell 1 is available can be understood as cell 1 is able to accommodate the UE for camping.

It is noted that the process of FIGS. 4 and 5 can be totally under the control of the macro RBS 101 or the small RBS 102, which will be described with reference to FIGS. 8 and 9 below. The process of FIGS. 4 and 5 can also be partly under the control of the macro RBS 101 or the small RBS 102, for example, intra-frequency measurement or inter-frequency measurement can be initiated by the UEs themselves while handover can be guided by the RBS, or vice versa.

As a whole or by scenario, it is advantageous to change the number of handover steps from two in the existing method to one, which contributes to reduction of the handover interruption time and hence make the mobility smoother and more robust.

Figure 8:
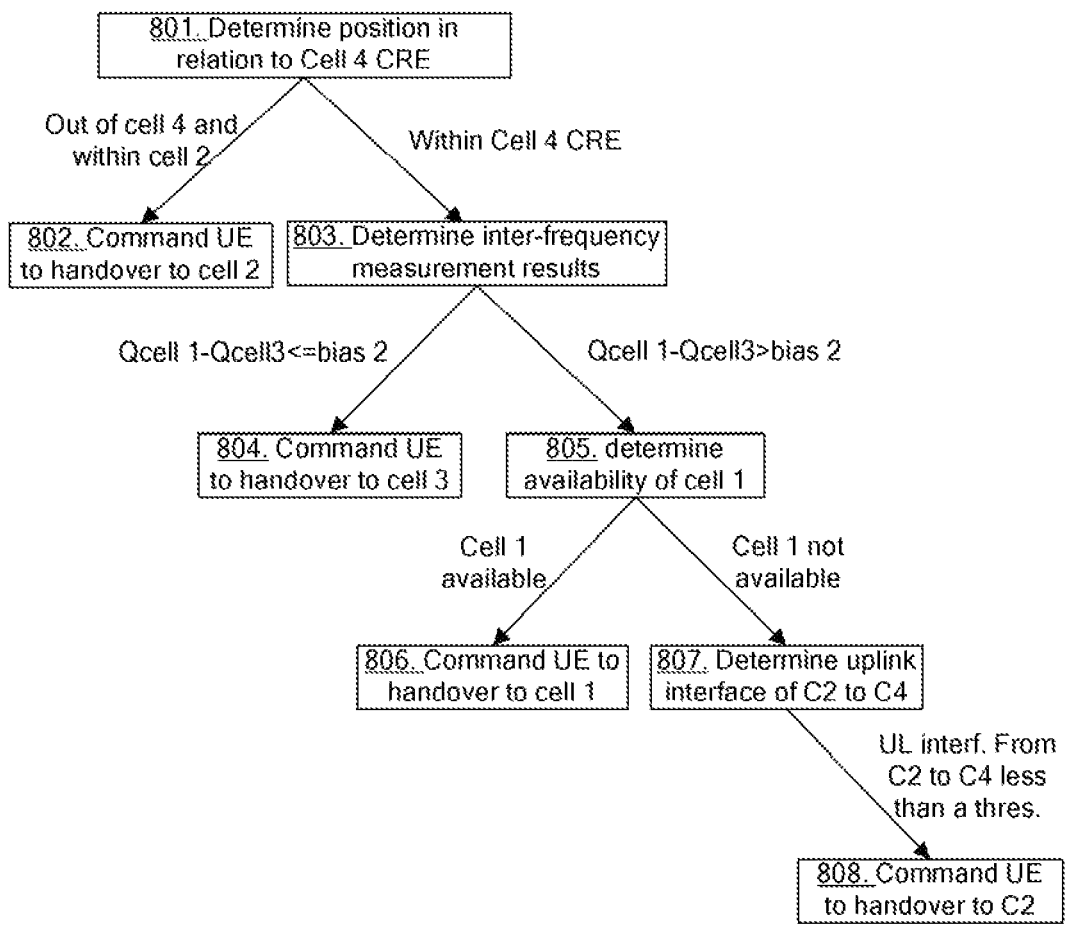
FIG. 8 illustrates a flowchart of one method performed in an RBS in accordance with embodiments of the present invention.

FIG. 8 illustrates a flowchart of one method performed in an RBS in accordance with embodiments of the present invention. In the scenario of FIG. 8, the UE 103 is initially connected to cell 4 and moves towards the macro RBS 101. At step 801, the small RBS 102 commands UE to perform intra-frequency measurement for determining its position in relation to CRE area of cell 4. This can be done, for example, by configuring the UE 103 with Event A3 intra-frequency measurement towards the intra-frequency cell (cell 2). Event A3 defines "neighbor becomes offset better than PCell", here offset equals to the original A3-offset plus cell-individual-offset. Such an event will trigger a measurement report (say, with Measurement-ID being 1) with the measured signal quality sending from the UE 103 to the small RBS 102.

In case that measured signal quality value from cell 2 is bigger than that from cell 4 in a measurement report, i.e., that the UE 103 is out of extended cell border of cell 4 and within cell range of cell 2, for example position A in FIG. 6, the small RBS 102 will command the UE 103 to perform handover to cell 2 at step 802.

When the UE 103 moves into CRE area of cell 4 (with outer border where the signal quality value of cell 2 is equal to the signal quality value of cell 4 plus its CRE bias and the inner border where the signal quality value of cell 1 is equal to the signal quality value of cell 4 included), prompted by a measurement report of Measurement-ID 1 being received from the UE 103, the small RBS 102 will configure the UE 103 to perform inter-frequency measurement for determining its position in relation to cell 3 at step 803, i.e., measuring signal qualities of inter-frequency cells of cell 1 and cell 3. This can be done by configuring the UE 103 with Event A4 inter-frequency measurement towards the inter-frequency cells of cell 3 and cell 1. Event A4 defines "measurement in neighbor cell becomes better than threshold", here threshold is set to either an empirical value above which the data transfer is available in the cellular network or the minimum value of −140 dBm regulated by 3GPP [36.331]. Such an event will trigger a measurement report (say, with Measurement-ID being 2) with the measured signal qualities sending from the UE 103 to the small RBS 102. This can also be done by configuring the UE 103 with Event A5 inter-frequency measurement towards the inter-frequency cells of cell 3 and cell 1. Event A5 defines "measurement in PCell becomes worse than threshold 1 and measurement in neighbor cell becomes better than threshold 2", here threshold 1 is set to a large value so that "PCell becomes worse than threshold 1" always holds true and the other parameters are set similarly to that in the Event A4. It is noted when the UE 103 locates right on the extended cell border of cell 3, signal quality value of cell 1 equals that of cell 3 plus CRE bias of cell 3. When the UE 103 is out of the extended cell border of cell 3, signal quality value of cell 1 is better that of cell 3 plus CRE bias of cell 3. When the UE 103 is within the extended cell border of cell 3, signal quality value of cell 1 is worse that of cell 3 plus CRE bias of cell 3. The small RBS 102 will determine relationship of signal quality value of cell 1, cell 2 and CRE bias of cell 3 sent in the measurement reports, i.e., the position of the UE 103 in relation to cell 3 based on the measured signal qualities. In another example, the position in relation to cell 3 can be determined without any measured signal qualities sent in measurement report of Measurement-ID 2. In one scenario, if the two frequency carriers lie in the same frequency band and have the same transmit power both in macro cells and small cells, the two co-deployed cells normally have the same coverage size. Therefore, the UE 103 who is in the "high-interference, non-protected" CRE area of the non-protected cell (cell 4) is just in the "high-interference, protected" CRE area of the protected cell (cell 3). In another scenario, for the possible reason that the two frequency carriers lie in different frequency bands or each or any of the common RBS has different transmit powers at these two frequencies, the two co-deployed cells corresponding to these two frequencies may have different coverage sizes. If the protected cell (cell 3) is larger than the non-protected cell (cell 4), the UE 103 who is in the "high-interference, non-protected" CRE area of the non-protected cell (cell 4) is also in the protected cell (cell 3). FIG. 6 illustrates a deployment of such a scenario, wherein circle 1 stands for original cell border of cell 4, circle 2 stands for original cell border of cell 3, circle 3 stands for extended cell border of cell 4 and circle 4 stands for extended cell border of cell 3. Positions B and C, which are between original cell border of cell 4 and extended cell border of cell 4, i.e., CRE area of cell 4, are obviously within circle 4, i.e., cell range (herein cell range refers to original cell range plus CRE area) of cell 3. However, in the deployment of FIG. 7 where the protected cell (cell 3) is smaller than the non-protected cell (cell 4), things are not necessarily the same. In the scenario of FIG. 7, positions A and B both belonging to the CRE area of cell 4 does not ensure them being within cell 3, for example, position A is out of cell 3 and thus measuring of the signal quality values of inter-frequency cells of cell 1 and 3 is needed to determine the position in relation to cell 3.

In case it is determined signal quality value from cell 1 is not bigger than that from cell 3 plus the CRE bias of cell 3, i.e., that the UE 103 within the CRE area of cell 4 is also within cell 3 (extended cell border of cell 3 included), for example, the UE 103 locates in positions B or C of FIG. 6 or location B of FIG. 7, the small RBS 102 will select cell 3 as the target cell, and command UE 103 to perform handover to cell 3 at step 804. In case that it is determined that signal quality value from cell 1 is bigger than that from cell 3 plus the CRE bias of cell 3, i.e., the UE 103 within the CRE area of cell 4 is out of cell 3, for example the UE 103 locates in position A of FIG. 7, the process will proceed to determine availability of cell 1 at step 805. Herein availability of cell 1 can be understood as ability of cell 1 to accommodate UE for camping. If the function of CCS is applied to all downlink sub frames of cell 1, then cell 1 with the same carrier frequency as the protected small cell (cell 3) lacks of necessary downlink control channels, and hence it cannot accommodate UE 103 for camping. If the function of CCS is applied to a part of downlink sub frames of cell 1, then cell 1 with the same carrier frequency as the protected small cell (cell 3) has limited or weakened capability to to accommodate UE 103 for camping. Under such a circumstance, with an additional condition that cell 1 is available being determined, the small RBS 102, as current serving RBS, will select cell 1 as the target cell and command the UE 103 to perform handover to cell 1 at step 806, otherwise, the small RBS 102 will determine uplink interferences from cell 2 to cell 4 at step 807. Generally, if the uplink interference is severe, for example, uplink interference strength not less than a predetermined threshold, the UE 103 will preferably just stay in cell 4, and if the uplink interference is not severe, for example, uplink interference strength less than a predetermined threshold, the small RBS 102 will select cell 2 as the target cell and configure the UE 103 to perform handover to cell 2 at step 808.

When UE 103 that has taken handover to cell 3 continues to move from small RBS 102 to macro RBS 101 in cell 3, and if macro cell 1 is not available, inter-frequency measurement would be configured to the UE 103, and the UE will finally perform handover to macro cell 2; and if macro cell 1 is available, intra-frequency measurement would be configured to the UE 103, and the UE will finally take handover to macro cell 1.

Figure 9:
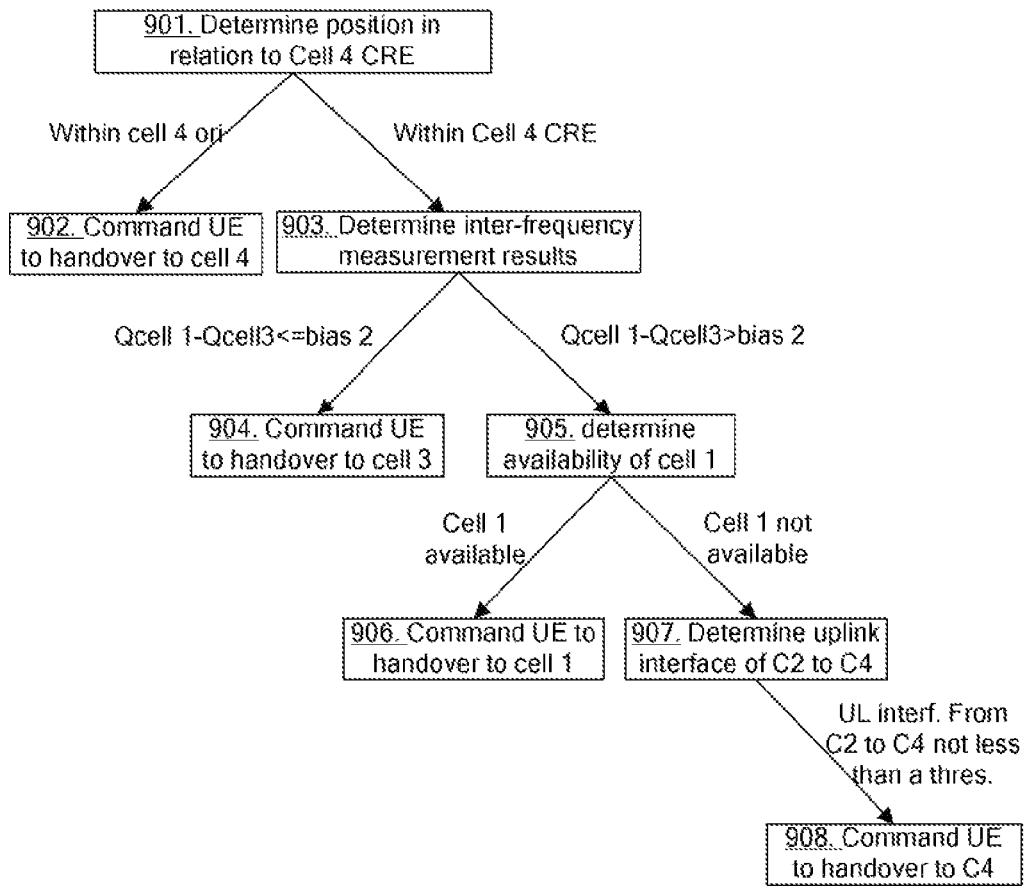
FIG. 9 illustrates a flowchart of another method performed in an RBS in accordance with embodiments of the present invention.

FIG. 9 illustrates a flowchart of another method performed in an RBS in accordance with embodiments of the present invention. In the scenario of FIG. 9, the UE 103 is initially connected to cell 2 and moves towards the small RBS 102. At step 901, the small RBS 102 commands UE to perform intra-frequency measurement for determining its position in relation to CRE area of cell 4. This can be done, for example, by configuring the UE 103 with Event A3 intra-frequency measurement towards the intra-frequency cell (cell 4). Event A3 defines "neighbor becomes offset better than PCell", here offset equals to the original A3-offset plus to cell-individual-offset. Such an event will trigger a measurement report (say, with Measurement-ID being 3) with the measured signal qualities sending from the UE 103 to the macro RBS 101.

In case that measured signal quality value from cell 2 is smaller than that from cell 4 in a measurement report, i.e., that the UE 103 is out of CRE area of cell 4 and within original cell range of cell 4, for example position D in FIG. 6, the macro RBS 101 will command the UE 103 to perform handover to cell 4 at step 902.

When the UE 103 moves into CRE area of cell 4 (with outer border where the signal quality value of cell 2 is equal to the signal quality value of cell 4 plus its CRE bias and the inner border where the signal quality value of cell 1 is equal to the signal quality value of cell 4 included), prompted by a measurement report of Measurement-ID 3 being received from the UE 103, the macro RBS 101 will configure the UE 103 to perform inter-frequency measurement for determining its position in relation to cell 3 at step 903 i.e., measuring signal qualities of inter-frequency cells of cell 1 and cell 3. This can be done by configuring the UE 103 with Event A4 inter-frequency measurement towards the inter-frequency cells of cell 3 and cell 1. Event A4 defines "measurement in neighbor cell becomes better than threshold", here threshold is set to either an empirical value above which the data transfer is available in the cellular network or the minimum value of −140 dBm regulated by 3GPP [36.331]. Such an event will trigger a measurement report (say, with Measurement-ID being 4) with measured signal qualities sending from the UE 103 to the macro RBS 101. This can also be done by configuring the UE 103 with Event A5 inter-frequency measurement towards the inter-frequency cells of cell 3 and cell 1. Event A5 defines "measurement in PCell becomes worse than threshold 1 and measurement in neighbor cell becomes better than threshold 2", here threshold 1 is set to a large value so that "PCell becomes worse than threshold 1" always holds true and the other parameters are set similarly to that in the Event A4. It is noted when the UE 103 locates right on the extended cell border of cell 3, signal quality value of cell 1 equals that of cell 3 plus CRE bias of cell 3. When the UE 103 is out of the extended cell border of cell 3, signal quality value of cell 1 is better that of cell 3 plus CRE bias of cell 3. When the UE is within the extended cell border of cell 3, signal quality value of cell 1 is worse than that of cell 3 plus CRE bias of cell 3. The macro RBS 101 will to determine relationship of signal quality value of cell 1, cell 2 and CRE bias of cell 3 sent in the measurement reports, i.e., the position of the UE 103 in relation to cell 3 based on the measured signal qualities. In another example, the position in relation to cell 3 can be determined without any measured signal qualities sent in measurement report (say, with Measurement-ID being 4). In one scenario, if the two frequency carriers lie in the same frequency band and each of the common RBS has the same transmit power at these two frequencies, the two co-deployed cells corresponding to these two frequencies normally have the same coverage size. Therefore, the UE 103 who is in the "high-interference, non-protected" CRE area of the non-protected cell (cell 4) is just in the "high-interference, protected" CRE area of the protected cell (cell 3). In another scenario, for the possible reason that the two frequency carriers lie in different frequency bands or each or any of the common RBS has different transmit powers at these two frequencies, the two co-deployed cells corresponding to these two frequencies may have different coverage sizes. If the protected cell (cell 3) is larger than the non-protected cell (cell 4), the UE 103 who is in the "high-interference, non-protected" CRE area of the non-protected cell (cell 4) is also in the protected cell (cell 3). FIG. 6 illustrates a deployment of such a scenario, wherein circle 1 stands for original cell border of cell 4, circle 2 stands for original cell border of cell 3, circle 3 stands for extended cell border of cell 4 and circle 4 stands for extended cell border of cell 3. Positions B and C, which are between original cell border of cell 4 and extended cell border of cell 4, i.e., CRE area of cell 4, are obviously within circle 4, i.e., cell range (herein cell range refers to original cell range plus CRE area) of cell 3. However, in the deployment of FIG. 7 where the protected cell (cell 3) is smaller than the non-protected cell (cell 4), things are not necessarily the same. In the scenario of FIG. 7, positions A and B both belonging to the CRE area of cell 4 does not ensure them within cell 3, for example, position A is out of cell 3 and thus measuring of the signal qualities of inter-frequency cells of cell 1 and 3 is needed to determine the position in relation to cell 3.

In case it is determined that signal quality value from cell 1 is not bigger than that from cell 3 plus the CRE bias of cell 3, i.e., the UE 103 within the CRE area of cell 4 is also within cell 3 (extended cell border of cell 3 included), for example, the UE 103 locates in positions B or C of FIG. 6 or location B of FIG. 7, the macro RBS 101 will select cell 3 as the target cell, and command UE 103 to perform handover to cell 3 at step 904.

In case that it is determined that signal quality value from cell 1 is bigger than that from cell 3 plus the CRE bias of cell 3, i.e., the UE 103 within the CRE area of cell 4 is out of cell 3, for example the UE 103 locates in position A of FIG. 7, the process will proceed to determine availability of cell 1 at step 905. Herein availability of cell 1 can be understood as ability of cell 1 to accommodate UE for camping. If the function of CCS is applied to all downlink sub frames of cell 1, then cell 1 with the same carrier frequency as the protected small cell (cell 3) lacks of necessary downlink control channel, and hence it cannot accommodate UE 103 for camping. If the function of CCS is applied to a part of downlink sub frames of cell 1, then cell 1 with the same carrier frequency as the protected small cell (cell 3) has limited or weakened capability to accommodate UE 103 for camping. With an additional condition that cell 1 is available being determined, the macro RBS 101, as current serving RBS, will select cell 1 as the target cell and command the UE 103 to perform handover to cell 1 at step 906, otherwise, the macro RBS 101 will determine detect uplink interferences from cell 2 to cell 4 at step 907. Generally, if the uplink interference is not severe, for example, uplink interference strength less than a predetermined threshold, the UE 103 will preferably just stay in cell 2, and if the uplink interference is severe, for example, uplink interference strength not less than a predetermined threshold, the macro RBS 101 will select cell 4 as the target cell and configure the UE 103 to perform handover to cell 4 at step 908.

As a whole or by scenario, it is advantageous to change the number of handover steps from two in the existing method to one, which contributes to reduction of the handover interruption time and hence make the mobility smoother and more robust.

Figure 10:
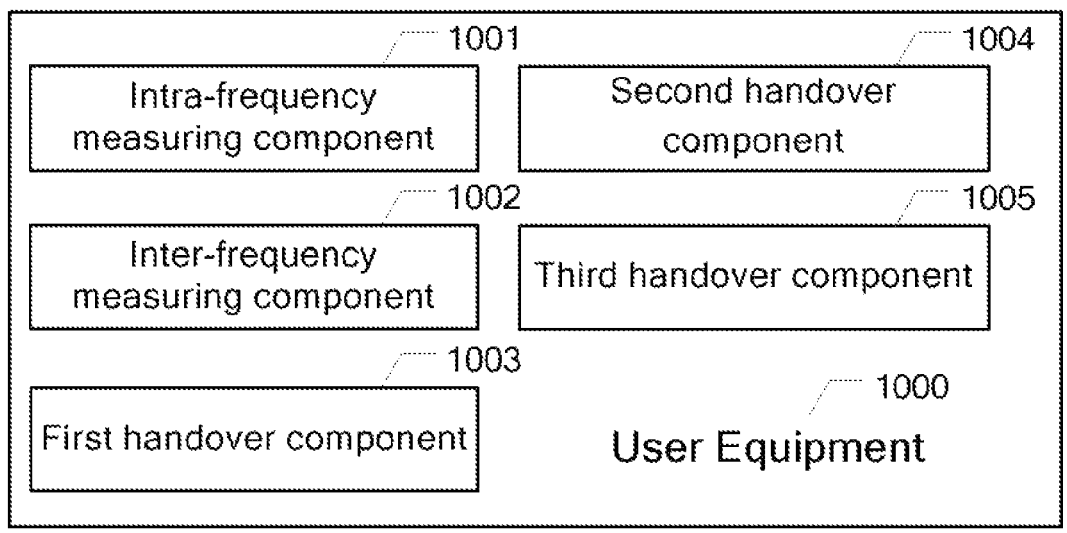
FIG. 10 illustrates a block diagram of a UE in accordance with embodiments of the present invention.

FIG. 10 illustrates a block diagram of a UE 1000 in accordance with embodiments of the present invention. The UE 103 is served in the system of FIG. 1. In FIG. 10, the UE 103 comprises an intra-frequency measuring component 1001, an inter-frequency measuring component 1002, a first handover component 1003, a second handover component 1004, and a third handover controller 1005. It should be appreciated that the UE 103 is not limited to the shown elements, and can comprise other conventional elements and additional elements implemented for other purposes.

The intra-frequency measuring component 1001 is adapted for performing intra-frequency measurement for determining whether the UE is within cell range extension, CRE, area of cell 4, with a CRE bias for downlink signal quality of cell 4 being applied for handover triggering condition; the inter-frequency measuring component 1002 is adapted for performing inter-frequency measurement for a target cell selection with another CRE bias for downlink signal quality of cell 3 being applied for handover triggering condition in case that the UE connected to cell 2 or cell 4 is within the CRE area of cell 4; and the first handover component 1003 is adapted for performing handover to the target cell; the second handover component 1004 is adapted for performing handover to cell 4 in case that the UE is connected to cell 2 and a first parameter indicating signal quality from cell 2 is smaller than that from cell 4; and the third handover component 1005 is adapted for performing handover to cell 2 in case that the UE is connected to cell 4, and the first parameter indicating signal quality from cell 2 is larger than that from cell 4 plus the first CRE bias.

The elements 1001-1005 are illustrated as separate elements in FIG. 10. However, this is merely to indicate that the functionalities are separated. The elements can be provided as separate hardware devices. However, other arrangements are possible, such as the first handover component 1003, the second handover component 1004 and the third handover component 1005 can be physically combined as one unit. Any combination of the elements can be implemented in any combination of software, hardware, and/or firmware in any suitable location. For example, there may be more controllers configured separately, or just one controller for all the controls.

The elements may constitute machine-executable instructions embodied within a machine, e.g., readable medium, which when executed by a machine will cause the machine to perform the operations described. Besides, any of the elements may be implemented as hardware, such as an application specific integrated circuit (ASIC), Digital Signal Processor (DSP), Field Programmable Gate Array (FPGA) or the like.

Besides, it should be understood that the arrangements described herein are set forth only as examples. Other arrangements and elements (e.g., more controllers or more detectors, etc.) can be used in addition to or instead of those shown, and some elements may be omitted altogether.

Functionalities and cooperation of those elements are described in detail with reference to FIGS. 4 and 5, wherein steps 401 and 501 are taken in the intra-frequency measuring component 1001, step 402 is taken in third handover component 1005, step 502 is taken in second handover component 1004, steps 403 and 503 are taken in the inter-frequency measuring component 1002, steps 404, 504, 405, 505, 406 and 506 are taken in the first handover component 1003.

Figure 11:
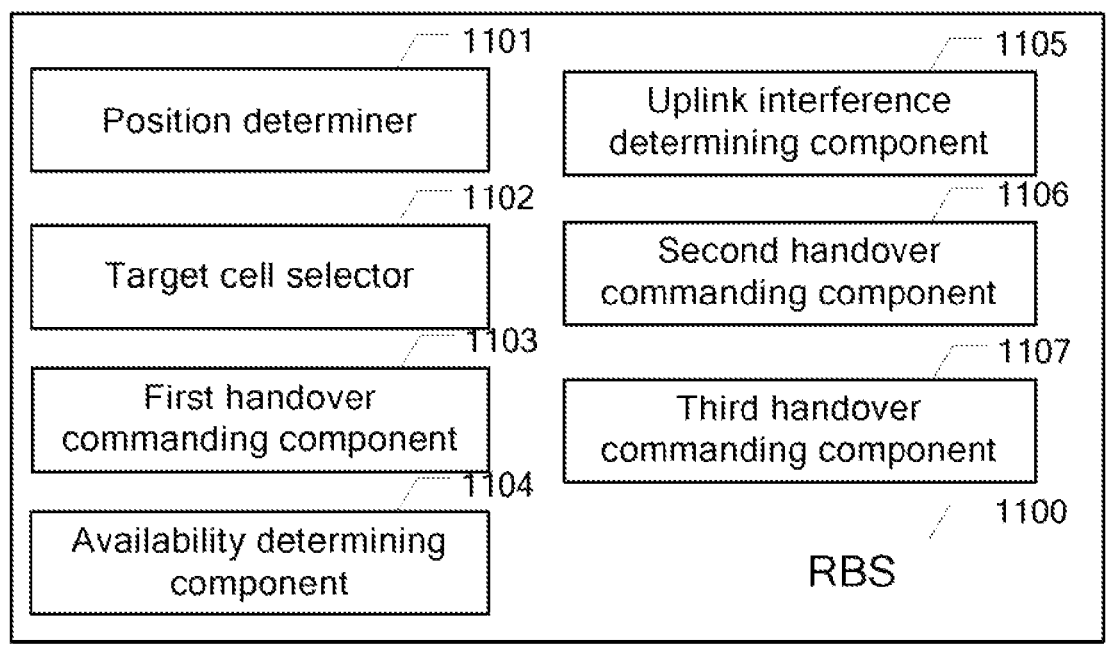
FIG. 11 illustrates a block diagram of an RBS in accordance with embodiments of the present invention.

FIG. 11 illustrates a block diagram of an RBS 1100 in accordance with embodiments of the present invention. The RBS 1100 is serving in the system of FIG. 1. In FIG. 11, the RBS comprises a position determiner 1101, a target cell selector 1102, a first handover commanding component 1103, an availability determining component 1104, an uplink interference determining component 1105, a second handover commanding component 1106, and a third handover commanding component 1107.

The position determiner 1101 is adapted for determining position of the UE in relation to area of cell 4 via intra-frequency measurement, with a CRE bias for downlink signal quality of cell 4 being applied for handover triggering condition; the target cell selector 1102 is adapted for selecting a target cell via at least inter-frequency measurement, with another CRE bias for downlink signal quality of cell 3 being applied for handover triggering condition in case that the UE connected to cell 2 or cell 4 is within the CRE area of cell 4; the first handover commanding component 1103 is adapted for commanding the UE to perform handover to the target cell; an availability determining component 1104 adapted for determining availability of cell 1 in case that the UE connected to cell 4 or cell 2 is within the CRE area of cell 4 and meanwhile a second parameter indicating signal quality from cell 1 is bigger than that from cell 3 plus the CRE bias of cell 3, wherein the target cell selector is adapted to select cell 1 as the target cell in case that cell 1 is available; the uplink interference determining component 1105 is adapted for detecting uplink interference from cell 2 to cell 4 in case that the UE connected to cell 4 or cell 2 is within the CRE area of cell 4 and meanwhile a second parameter indicating signal quality from cell 1 is bigger than that from cell 3 plus the another CRE bias, and that cell 1 is unavailable, wherein in case that the uplink interference from cell 2 to cell 4 is less than a threshold and the UE is connected to cell 4, the target cell selector is adapted to select cell 2 as the target cell, and wherein in case that the uplink interference from cell 2 to cell 4 is not less than the threshold and the UE is connected to cell 2, the target cell selector is adapted to select cell 4 as the target cell; the second handover commanding component 1106 is adapted for commanding the UE to perform handover to cell 4 in case that the UE is connected to cell 2 and a first parameter indicating signal quality from cell 2 is smaller than that from cell 4; and the third handover commanding component 1107 is adapted for commanding the UE to perform handover to cell 2 in case that the UE is connected to cell 4, and the first parameter indicating signal quality from cell 2 is larger than that from cell 4 plus the CRE bias.

The elements 1101-1107 are illustrated as separate elements in FIG. 11. However, this is merely to indicate that the functionalities are separated. The elements can be provided as separate hardware devices. However, other arrangements are possible, such as the elements 1104-1105 can be physically combined into element 1102 as one unit. Any combination of the elements can be implemented in any combination of software, hardware, and/or firmware in any suitable location.

The elements may constitute machine-executable instructions embodied within a machine, e.g., readable medium, which when executed by a machine will cause the machine to perform the operations described. Besides, any of the elements may be implemented as hardware, such as an application specific integrated circuit (ASIC), Digital Signal Processor (DSP), Field Programmable Gate Array (FPGA) or the like.

Besides, it should be understood that the arrangements described herein are set forth only as examples. Other arrangements and elements (e.g., more commanding components, etc.) can be used in addition to or instead of those shown, and some elements may be omitted altogether.

Functionalities and cooperation between those elements are described in detail with reference to FIGS. 8 and 9, wherein steps 801 and 901 are taken in the position determiner 1101; step 802 is taken in the third handover commanding component 1107; step 902 is taken in the second handover commanding component 1106; steps 804, 806, 808, 904, 906, and 908 are taken in the target cell selector 1102 in combination with the first handover commanding component 1103; steps 803 and 903 are also taken in the target cell selector 1102; steps 805 and 905 are taken in the availability determining component 1104, steps 807 and 907 are taken in the uplink interference determining component 1105.

Figure 12:
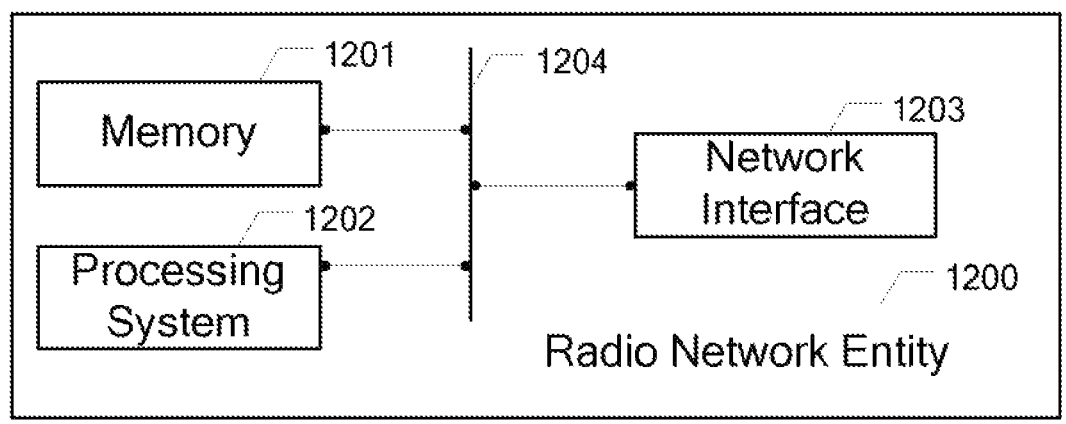
FIG. 12 illustrates a block diagram showing example physical components of a radio network entity in accordance with embodiments of the present invention.

FIG. 12 illustrates a block diagram showing example physical components of a radio network entity 1200 in accordance with embodiments of the present invention. The macro RBS 101, small RBS 102, or the UE 103, according to the present invention, as a radio network entity, has components similar to those of the radio network entity 1200. It should be appreciated that these radio network entities can be implemented using components other than those illustrated in the example of FIG. 10.

In the example of FIG. 10, the radio network entity 1200 comprises a memory 1201, a processing system 1202, a network interface 1203, and a communication medium 1204. The memory 1201 includes one or more than one computer-usable or computer-readable storage medium capable of storing data and/or computer-executable instructions. Is should be appreciated that the storage medium is preferably a non-transitory storage medium.

The processing system 1202 includes one or more than one processing unit. A processing unit is a physical device or article of manufacture comprising one or more integrated circuits that read data and instructions from computer readable media, such as the memory 1201, and selectively execute the instructions. In various embodiments, the processing system 1202 is implemented in various ways. For example, the processing system 1202 can be implemented as one or more than one processing core. In another example, the processing system 1202 can comprise one or more than one separate microprocessor. In yet another example embodiment, the processing system 1202 can comprise an application-specific integrated circuit (ASIC) that provides specific functionality. In yet another example, the processing system 1202 provides specific functionality by using an ASIC and by executing computer-executable instructions.

The network interface 1203 is a device or article of manufacture that enables the radio network entity 1200 to send data to or receive data from other radio network entities. In different embodiments, the network interface 1203 is implemented in different ways. For example, the network interface 1203 can be implemented as an Ethernet interface, a token-ring network interface, a fiber optic network interface, a wireless network interface (e.g., Wi-Fi, WiMax, etc.), or another type of network interface.

The communications medium 1204 facilitates communication among the hardware components of the network device 1200. In the example of FIG. 10, the communications medium 1204 facilitates communication among the memory 1201, the processing system 1202, and the network interface 1203. The communications medium 1204 can be implemented in various ways. For example, the communications medium 1204 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a small Computing system Interface (SCSI) interface, or another type of communications medium.

The memory 1201 stores various types of data and/or software instructions. For instance, in the example of FIG. 10, the instructions in the memory 1201 can include those that when executed in the processing system, cause the network device 1200 to implement the methods described herein.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method of mobility management for a user equipment, UE, in a wireless communication network, the wireless communication network comprising at least a first radio base station, RBS, serving at least a first cell over a first frequency and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell, the method comprising:
performing intra-frequency measurement for determining whether the UE is within cell range extension, CRE, area of the fourth cell, with a first positive bias for downlink signal quality of the fourth cell being applied for handover triggering condition;
in case that the UE connected to the second cell or the fourth cell is within the CRE area of the fourth cell, performing the following steps:
performing inter-frequency measurement for a target cell selection, with a second positive bias for downlink signal quality of the third cell being applied for handover triggering condition; and
performing handover to the target cell.

2. The method of claim 1, wherein if a first parameter indicating signal quality from the second cell is not smaller than that from the fourth cell but not bigger than that from the fourth cell plus the first positive bias, then the UE is determined to be within CRE area of the fourth cell.

3. The method of claim 1, wherein if a second parameter indicating signal quality from the first cell is not bigger than that from the third cell plus the second positive bias, then the third cell is selected as the target cell.

4. The method of claim 2, wherein the first parameter or the second parameter is reference signal received power or reference signal received quality.

5. The method of claim 1, wherein the second cell and the third cell are primary cells, and the first cell and the fourth cell are secondary cells, in terms of carrier aggregation and cross carrier scheduling.

6. The method of claim 1, wherein in case that the UE connected to the fourth cell or the second cell is within the CRE area of the fourth cell and meanwhile a second parameter indicating signal quality from the first cell is bigger than that from the third cell plus the second positive bias, and the first cell is available, the first cell is selected as the target cell;
and wherein in case that the UE connected to the fourth cell or the second cell is within the CRE area of the fourth cell and meanwhile a second parameter indicating signal quality from the first cell is bigger than that from the third cell plus the second positive bias, and the first cell is unavailable, then:
further in case that the uplink interference from the second cell to the fourth cell is less than a threshold and the UE is connected to the fourth cell, the second cell is selected as the target cell; or
further in case that the uplink interference from the second cell to the fourth cell is not less than a threshold and the UE is connected to the second cell, the fourth cell is selected as the target cell.

7. The method of claim 1, further comprising:
in case that the UE is connected to the second cell and a first parameter indicating signal quality from the second cell is smaller than that from the fourth cell, performing handover to the fourth cell; and
in case that the UE is connected to the fourth cell, and the first parameter indicating signal quality from the second cell is larger than that from the fourth cell plus the first positive bias, performing handover to the second cell.

8. A user equipment, UE, in a wireless communication network, the wireless communication network comprising at least a first radio base station, RBS, serving at least a first cell over a first frequency and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell, the UE comprising:
an intra-frequency measuring component configured to perform intra-frequency measurement for determining whether the UE is within cell range extension, CRE, area of the fourth cell, with a first positive bias for downlink signal quality of the fourth cell being applied for handover triggering condition;
an inter-frequency measuring component configured to perform inter-frequency measurement for a target cell selection with a second positive bias for downlink signal quality of the third cell being applied for handover triggering condition in case that the UE connected to the second cell or the fourth cell is within the CRE area of the fourth cell; and
a first handover component configured to perform handover to the target cell.

9. The method of claim 8, wherein if a first parameter indicating signal quality from the second cell is not smaller than that from the fourth cell but not bigger than that from the fourth cell plus the first positive bias, then the UE is determined to be within CRE area of the fourth cell.

10. The UE of claim 8, wherein if a second parameter indicating signal quality from the first cell is not bigger than that from the third cell plus the second positive bias, then the third cell is selected as the target cell.

11. The UE of claim 9, wherein the first parameter or the second parameter is reference signal received power or reference signal received quality.

12. The UE of claim 8, wherein the second cell and the third cell are primary cells, and the first cell and the fourth cell are secondary cells, in terms of carrier aggregation and cross carrier scheduling.

13. The UE of claim 8, wherein in case that the UE connected to the fourth cell or the second cell is within the CRE area of the fourth cell and meanwhile a second parameter indicating signal quality from the first cell is bigger than that from the third cell plus the second positive bias, and the first cell is available, the first cell is selected as the target cell;
and wherein in case that the UE connected to the fourth cell or the second cell is within the CRE area of the fourth cell and meanwhile a second parameter indicating signal quality from the first cell is bigger than that from the third cell plus the second positive bias, and the first cell is unavailable, then:
in case that the uplink interference from the second cell to the fourth cell is less than a threshold and the UE is connected to the fourth cell, the second cell is selected as the target cell; or
in case that the uplink interference from the second cell to the fourth cell is not less than a threshold and the UE is connected to the second cell, the fourth cell is selected as the target cell.

14. The UE of claim 8, further comprising:
a second handover component configured to perform handover to the fourth cell in case that the UE is connected to the second cell and a first parameter indicating signal quality from the second cell is smaller than that from the fourth cell; and
a third handover component configured to perform handover to the second cell in case that the UE is connected to the fourth cell, and the first parameter indicating signal quality from the second cell is larger than that from the fourth cell plus the first positive bias.

15. A method of mobility management for a user equipment, UE, in a wireless communication network, the wireless communication network comprising at least a first radio base station, RBS, serving at least a first cell over a first frequency, and a second cell over a second frequency, and a second RBS serving at least a third cell over the first frequency and a fourth cell over the second frequency, wherein the first cell and the second cell are macro cells and are overlapped, the third cell and the fourth cell are small cells and are overlapped, the first frequency and the second frequency are different, the third cell and the fourth cell are within the first cell and the second cell, and the third cell is a protected cell, the method being performed in the RBS, comprising:
determining position of the UE in relation to cell range extension, CRE, area of the fourth cell via intra-frequency measurement, with a first positive bias for downlink signal quality of the fourth cell being applied for handover triggering condition;
in case that the UE connected to the second cell or the fourth cell is within the CRE area of the fourth cell, performing the following steps:
selecting a target cell via at least inter-frequency measurement, with a second positive bias for downlink signal quality of the third cell being applied for handover triggering condition; and
commanding the UE to perform handover to the target cell.

16. The method of claim 15, wherein in case that a first parameter indicating signal quality from the second cell is not smaller than that from the fourth cell and not bigger than that from the fourth cell plus the first positive bias, determining the UE connected to the second cell or the fourth cell is within the CRE area of the fourth cell.

17. The method of claim 15, wherein in case that a second parameter indicating signal quality from the first cell is not bigger than that from the third cell plus the second positive bias, selecting the third cell as the target cell.

18. The method of claim 16, wherein the first parameter or the second parameter is reference signal received power or reference signal received quality.

19. The method of claim 15, wherein the second cell and the third cell are primary cells, and the first cell and the fourth cell are secondary cells.

20. The method of claim 15, further comprising:
in case that the UE connected to the fourth cell or the second cell is within the CRE area of the fourth cell and meanwhile a second parameter indicating signal quality from the first cell is bigger than that from the third cell plus the second positive bias, determining availability of the first cell and:
in case that the first cell is available, selecting the first cell as the target cell;
otherwise:
determining uplink interference from the second cell to the fourth cell;
in case that the uplink interference from the second cell to the fourth cell is less than a threshold and the UE is connected to the fourth cell, selecting the second cell as the target cell; and
in case that the uplink interference from the second cell to the fourth cell is not less than the threshold and the UE is connected to the second cell, selecting the fourth cell as the target cell.

* * * * *